United States Patent
Flaherty et al.

(10) Patent No.: US 10,154,091 B1
(45) Date of Patent: Dec. 11, 2018

(54) DEPLOYING INFRASTRUCTURE UNITS ACCORDING TO RESOURCE HOSTING CONSTRAINTS

(71) Applicant: Amazon Technologies, Inc., Seattle, WA (US)

(72) Inventors: Mitchell Gannon Flaherty, Seattle, WA (US); Christopher Magee Greenwood, Seattle, WA (US); Surya Prakash Dhoolam, Seattle, WA (US); Gary Michael Herndon, Jr., Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 14/981,651

(22) Filed: Dec. 28, 2015

(51) Int. Cl.
G06F 15/173 (2006.01)
H04L 29/08 (2006.01)
H04L 12/911 (2013.01)

(52) U.S. Cl.
CPC .......... *H04L 67/1097* (2013.01); *H04L 47/70* (2013.01)

(58) Field of Classification Search
CPC ....... G06F 2211/1028; G06F 2209/501; G06F 3/0617; H04L 67/1097
USPC ........................................................ 709/226
See application file for complete search history.

(56) References Cited

U.S. PATENT DOCUMENTS

| | | | |
|---|---|---|---|
| 8,458,329 B2 | 6/2013 | Kolin et al. | |
| 8,645,722 B1 | 2/2014 | Weber et al. | |
| 8,677,309 B2 | 3/2014 | Xie et al. | |
| 2002/0087611 A1* | 7/2002 | Tanaka | G06F 9/5077 718/1 |
| 2005/0075937 A1 | 4/2005 | Bresniker et al. | |
| 2007/0043860 A1* | 2/2007 | Pabari | G06F 9/5072 709/224 |
| 2009/0019535 A1 | 1/2009 | Mishra et al. | |
| 2013/0198740 A1* | 8/2013 | Arroyo | H04L 41/0806 718/1 |
| 2014/0278326 A1 | 9/2014 | Sharma et al. | |

* cited by examiner

*Primary Examiner* — Tauqir Hussain
(74) *Attorney, Agent, or Firm* — Robert C. Kowert; Meyertons, Hood, Kivlin, Kowert & Goetzel, P.C.

(57) ABSTRACT

A distributed system may deploy infrastructure units according to resource hosting constraints. Additional infrastructure units, or infrastructure units to be redeployed, may be identified for deployment. State information describing the deployment of infrastructure units currently deployed amongst different infrastructure localities of a distributed system may be evaluated for different possible deployments according to resource hosting constraints. Possible deployments that optimize or increase resource hosting capacity in the distributed system within the resource hosting constraints may be determined. Deployment at those infrastructure localities of the determined possible deployments may be directed.

20 Claims, 9 Drawing Sheets

DEPLOYING INFRASTRUCTURE UNITS ACCORDING TO RESOURCE HOSTING CONSTRAINTS

BACKGROUND

The recent revolution in technologies for dynamically sharing virtualizations of hardware resources, software, and information storage across networks has increased the reliability, scalability, and cost efficiency of computing. More specifically, the ability to provide on demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Virtualized computing environments are may provide various guarantees as to the availability and durability of computing resources. Distributing computing resources amongst multiple resource hosts may provide different availability and durability characteristics. For example, virtual computing resources may provide block-based storage. Such block-based storage provides a storage system that is able to interact with various computing virtualizations through a series of standardized storage calls that render the block-based storage functionally agnostic to the structural and functional details of the volumes that it supports and the operating systems executing on the virtualizations to which it provides storage availability. In order to provide block-based storage, different techniques to deploy the infrastructure of the block-based storage may be provided in order to optimize or increase performance of storage resources hosted by the block-based storage.

Figure 1:
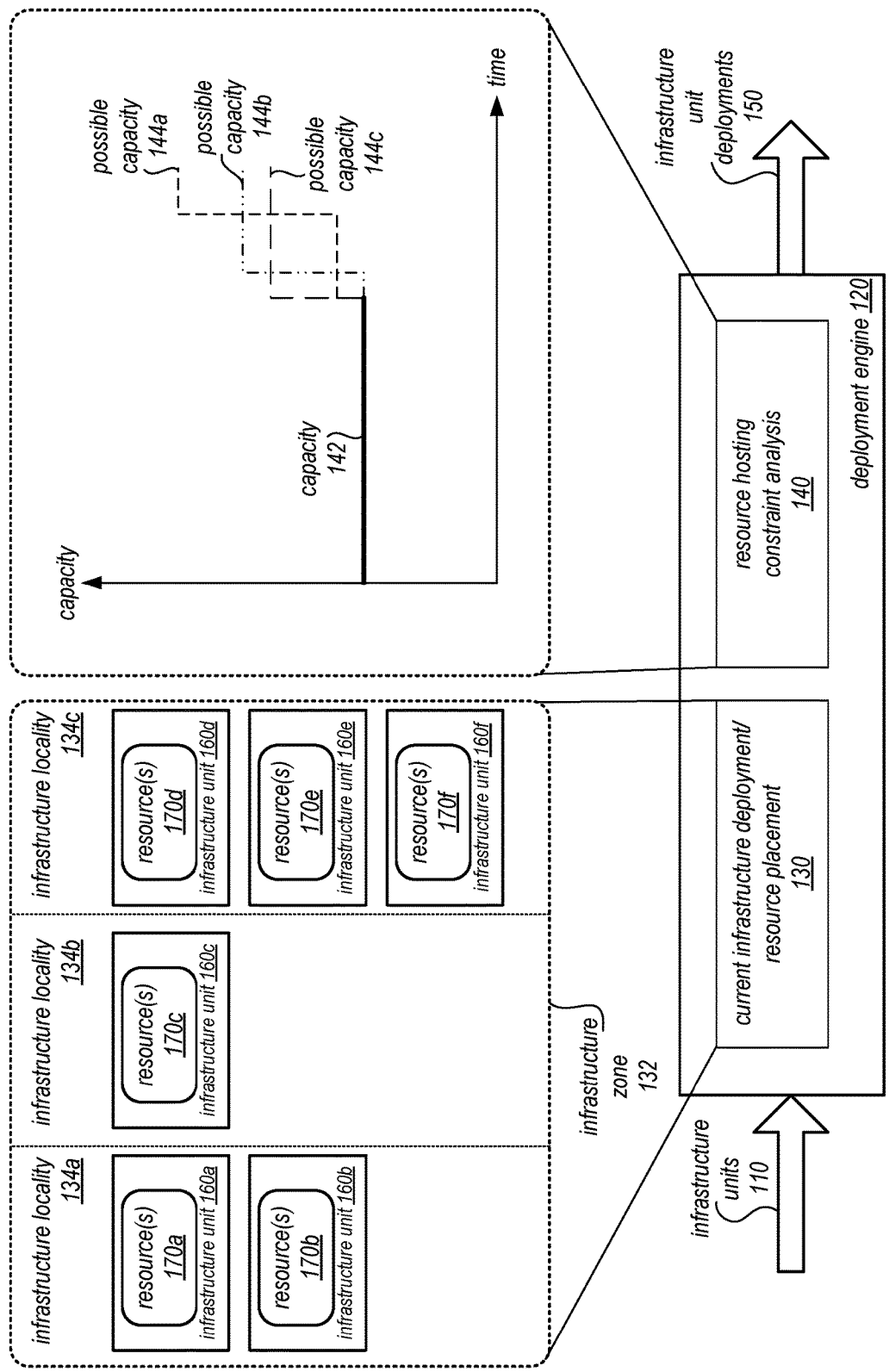
FIG. 1 illustrates a logical block diagram for deploying infrastructure units according to resource hosting constraints, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement deploying infrastructure units according to resource hosting constraints. Distributed systems may host various resources for performing or implementing different systems, services, applications and/or functions. Resources may be associated with other resources in the distributed system working, operating, or otherwise interacting together. In at least some embodiments, associated resources may implement a distributed resource. Resources may be one of many different types of distributed resources, such as one of various types of physical or virtualized computing resources, storage resources, or networking resources. For example, a storage service may host different replicas of data (e.g., a data volume) across a number of associated resources at resource hosts (e.g., providing a distributed storage resource that is a data volume). Associated resources may provide the same or different functionality, operations, interactions, or other tasks. Consider the data volume example given above, associated resources may include multiple replicas of the data volume, one of which may operate as a master replica performing certain functions, while other resources may be slave replicas of the data volume performing other functions. Alternatively, some resources may maintain different partitions of the data volume, in some embodiments, or perform different roles or tasks (e.g., some resources may provide front-end application processing while other resources may implement back-end processing for a distributed resource). In some embodiments, the associated resources may include a client (e.g., a virtual compute instance attached to the data volume).

In order to host resources, such as the data volumes discussed above, various infrastructure units may be utilized to provide the physical infrastructure upon which resources may be hosted. For example infrastructure units may include various data center or other distributed system components, including power distribution devices and supplies, networking devices, and/or computing or storage devices, such as server racks that contain one or multiple servers or other computing devices which can implement the described resources. Deployment of infrastructure units may impact the performance of associated resources implemented based on the infrastructure units. For example, different configurations of infrastructure units may be implemented to provide or improve availability, durability, and/or other performance characteristics of associated resources.

In some embodiments, resource hosting constraints may be implemented to ensure minimal levels of availability, durability, or other performance characteristics of resources. While placement of resources on the various infrastructure units may be performed to satisfy the resource hosting constraints, the placement options for resources may be limited due to the required infrastructure units needed to host a particular resource. Thus, placement techniques may only partially account for the ability to optimize or increase the performance of resources within resource hosting constraints. By deploying infrastructure units according to resource hosting constraints, optimal placement scenarios may be provided without significant cost to change current placements or performing other operations to enhance performance of resources post infrastructure unit deployment. For example, if a resource hosting constraint requires that certain resources that share a common network zone, such as being hosted at servers connected to a same network router (e.g., storage server racks connected to the same network brick as computing server racks which host clients of the storage server racks), then deployment of infrastructure units at different infrastructure localities may be performed so that such scenarios and conditions exist and/or are possible for resources.

Consider an example data storage service that deploys different storage server racks to different locations within a data center or group of data centers over time. The data storage service may provide storage for other computing resources in the data centers. In order to provide better performance, it may be desirable to connect storage server racks to a same networking device within a data center (e.g., a network switch or brick) as computing server racks (or other computing devices which utilize storage on the storage server racks). In order to evaluate possible deployments of additional storage server racks, a resource hosting constraint, that each storage server rack be deployed in a location that optimizes or increases the amount of storage available to clients connected to a same networking device, may be evaluated. For instance, if a storage server rack is being considered for deployment at three different locations (connected to different network bricks), then the amount of demand for storage by clients also connected to the different network bricks may be considered in order to select which possible deployment should be the deployment location. If the first deployment location would satisfy demand for 10 Gigabytes of storage for clients, the second deployment location would satisfy demand for 15 Gigabytes, and the third storage location would satisfy demand for 8 Gigabytes, then the second deployment location may be selected. Other resource hosting constraints may also be considered. For example, in addition to having storage connected to the same networking device as a client, a replica scheme for stored data may require that different replicas of data for a client be hosted on different storage server racks. If, for instance, the second deployment location has demand for 15 Gigabytes, but no other available storage space at other server racks to store replicas for data, then adding only 1 storage server rack to the networking device would not increase the amount data that could be stored to satisfy the 15 Gigabyte demand (as there would be no location to place replicas of data). One of the other two deployment locations may have less demand but more space available for replicas and thus may be selected in order to satisfy both resource hosting constraints. As many different types of resource hosting constraints may be considered the previous discussion is merely provided as an example of the types of evaluations performed to optimize or increase the resource hosting capacity for a distributed system when deploying infrastructure units and is not intended to be limiting.

FIG. 1 illustrates a logical block diagram for deploying infrastructure units according to resource hosting constraints, according to some embodiments. Deployment engine 120 may provide deployment determinations for different infrastructure units 110. Requests for deployment (or indications from a capacity planning system or infrastructure unit acquisition system) may be provided to deployment engine 120 in order to determine deployments for the different infrastructure units. Requests 110 may indicate a deployment schedule or other information describing different points in time within a period of time at which infrastructure unit deployments may be made (e.g., a deployment calendar).

Deployment engine 120 may access current infrastructure deployment and resource placement 130 to evaluate possible deployments. For example, an infrastructure zone 132 (e.g., data center, group/region of data centers, or other large devices implementing a distributed system) may be implemented which provides groups of different infrastructure localities, such as localities 134a, 134b, and 134c. The current deployments of infrastructure units within the different localities as well as the resource placements at the different infrastructure units may be evaluated. For example, the resources 170a on infrastructure unit 160a, and resources 170b on infrastructure unit 160b may be evaluated for possible deployments. Similarly in infrastructure locality 134b, the resources 170c on infrastructure unit 160c may be evaluated for possible deployments. Likewise resources 170d, 170e, and 170f, on respective infrastructure units 160d, 160e, and 160f in locality 134c may be evaluated for possible deployments.

An infrastructure locality may be a particular geographical, physical, or logical zone in which resource membership in or the location of a resource within the infrastructure zone may be determined. For example an infrastructure locality may be a locality related to network availability or topology (e.g., it takes the same number of network hops to reach resources within the infrastructure locality). An infrastructure locality may be identified by a particular device or system (e.g., hosts connected to a same network router, or brick, or power source may be in the same infrastructure locality). Infrastructure localities may vary in scope such that a resource host (and resources implemented on the resource host) may be within multiple different types of infrastructure localities, such as a particular network router or brick, a particular room location, a particular site, etc. Multiple infrastructure localities may be analyzed for prospective placement configurations. An infrastructure locality may be a determination of membership or location within a certain type of infrastructure zone (e.g., network router or brick locality).

Deployment engine 120 may implement resource hosting constraint analysis 140 to evaluate and optimize (or increase) the capacity 142 for resources when making deployment decisions. Different optimization functions and/or metrics may be utilized to select optimal capacity. For example, optimization functions may optimize or increase the capacity of resources for a current time or over period of time. Consider the data volume example noted above. Deployment decisions to deploy storage server racks to host data volumes may optimize or increase the amount of data volumes provided by the deployed server racks over a period of time, such as the amount of storage provided (e.g., in bytes) over time (e.g., in minutes) within a given time period (e.g., a year). Thus, when determining deployments for the storage server racks, an optimization function may select deployments that achieve the greatest number of byte-minutes in a year (which may be different than optimizing for the number of bytes provided at a discrete point in time, such as a current point in time). The illustrated possible capacities 144a, 144b, and 144c, further highlight such a distinction. For example, the possible deployments corresponding to possible capacity 144c result in the greatest capacity increase immediately, whereas the deployments for capacities 144a and 144b are not greater than 144c initially. Instead, such deployments increase the greater long term amount of capacity if selected. Possible capacity 144a, for instance, does not change capacity for resource hosting initially, but at a later time will allow for the highest possible hosting capacity. By utilizing optimizing functions that can optimize or increase capacity for different time periods, the impact of staggered deployments of resources over a period of time may be better optimized than selecting the best deployment for a current time. However, some scenarios may benefit from optimizing functions that optimize or increase deployments for a current time and thus the previous examples are not intended to be limiting. Various scoring techniques, such as those discussed below with regard to FIG. 7 may be implemented to determine which ones of possible deployments are optimized and should be selected for deploying infrastructure units 110.

Infrastructure unit deployments 150 may then be provided, indicating the determined infrastructure locality at which an infrastructure unit is to be deployed. Such deployments may be actively managed or directed by deployment engine 120, by providing real-time deployment instructions or verification of deployment for infrastructure units. Additional, deployment plans and other mapping information may be provided to describe deployment determinations made for infrastructure units. As deployments of infrastructure units 110 may occur at different points over a period of time, deployment decisions for individual infrastructure units may be provided as needed or described all at once in a deployment plan.

Please note that previous descriptions are not intended to be limiting, but are merely provided as an example of deploying infrastructure units according to resource hosting constraints. Various components may perform infrastructure unit deployment. Different numbers or types of resources and infrastructure localities may be employed.

This specification begins with a general description of a provider network, which may implement deploying infrastructure units according to resource hosting constraints for resources offered via one or more network-based services in the provider network, such as data volumes offered via a block-based storage service. Then various examples of a block-based storage service are discussed, including different components/modules, or arrangements of components/module that may be employed as part of volume placement for data volumes in the block-based storage service. A number of different methods and techniques to implement deploying infrastructure units according to resource hosting constraints are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
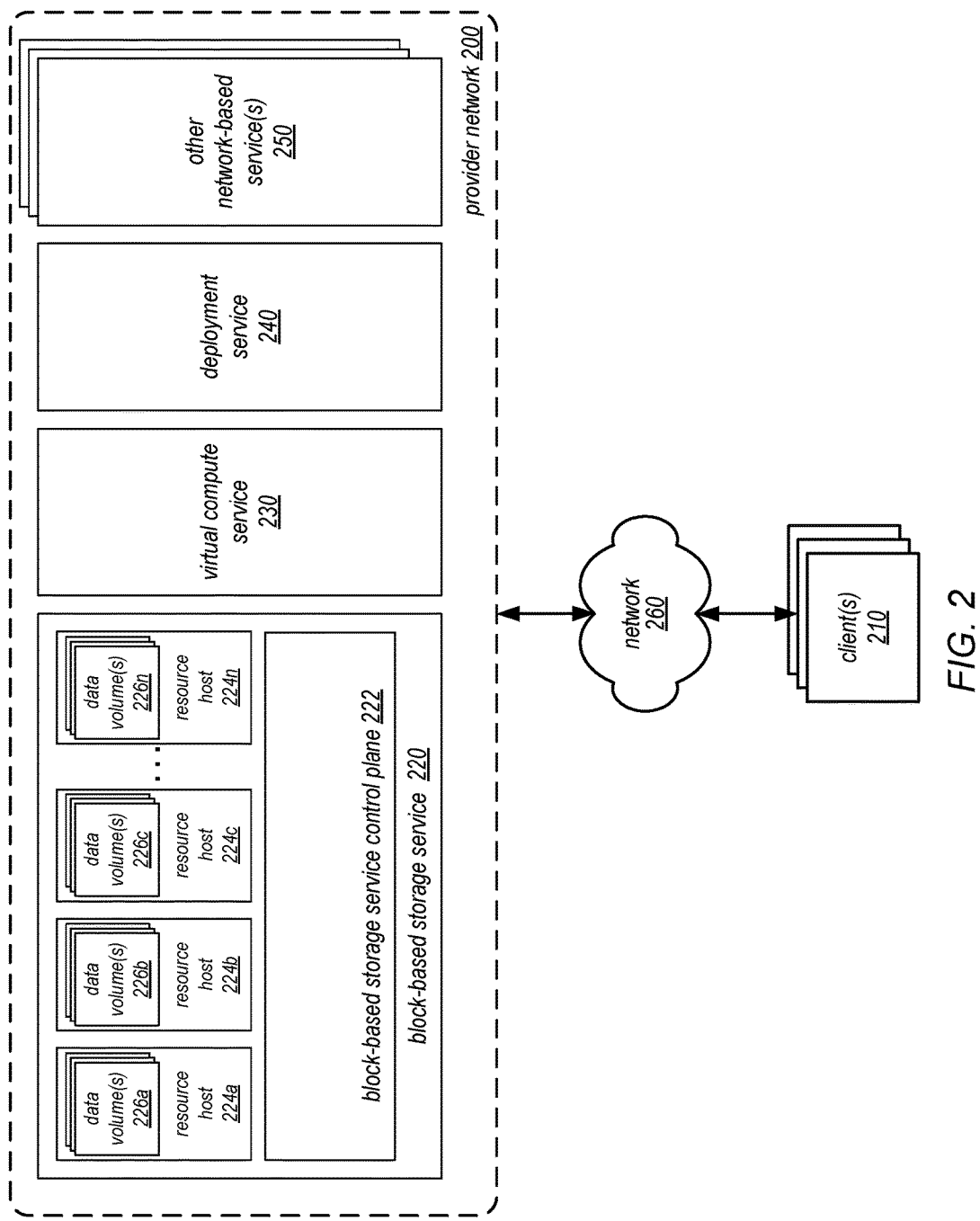
FIG. 2 is a block diagram illustrating a provider network implementing multiple network-based services including a block-based storage service and other services that utilize a deployment service for deploying infrastructure units according to resource hosting constraints, according to some embodiments.

FIG. 2 is a block diagram illustrating a provider network implementing multiple network-based services including a block-based storage service and other services that utilize a deployment service for deploying infrastructure units according to resource hosting constraints, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may provide computing resources, such as virtual compute service 230, storage services, such as block-based storage service 220 and other storage services (which may include various storage types such as object/key-value based data stores or various types of database systems), and/or any other type of network-based services 250. Provider network may also implement deployment service 240, discussed in detail below with regard to FIG. 3, in order to provide deployment of infrastructure units for other services of provider network. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In various embodiments, provider network 200 may also implement block-based storage service 220 for performing storage operations. Block-based storage service 220 is a storage system, composed of a pool of multiple independent resource hosts 224a, 224b, 224c through 224n(e.g., server block data storage systems), which provide block level storage for storing one or more sets of data volumes data volume(s) 226a, 226b, 226c, through 226n. Data volumes 226 may be mapped to particular clients (e.g., a virtual compute instance of virtual compute service 230), providing virtual block-based storage (e.g., hard disk storage or other persistent storage) as a contiguous set of logical blocks. In some embodiments, a data volume 226 may be divided up into multiple data chunks or partitions (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service. Snapshot operations may be performed to send, copy, and/or otherwise preserve the snapshot of a given data volume in another storage location, such as a remote snapshot data store in other storage service.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane may implement volume placement 228, such as described in further detail below with regard to FIG. 3. Block-based storage service control plane 222 may also provide services related to the creation, usage and deletion of volume snapshots on other storage service. Block-based storage service control plane 222 may also provide services related to the collection and processing of performance and auditing data related to the use of data volumes 226 and snapshots of those volumes.

Provider network 200 may also implement another storage service as part of other services 250, as noted above. Other storage services may provide a same or different type of storage as provided by block-based storage service 220. For example, in some embodiments other storage services may provide an object-based storage service, which may store and manage data as data objects. For example, volume snapshots of various data volumes 226 may be stored as snapshot objects for a particular data volume 226. In addition to other storage services, provider network 200 may implement other network-based services, which may include various different types of analytical, computational, storage, or other network-based system allowing clients 210, as well as other services of provider network 200 (e.g., block-based storage service 220, virtual compute service 230 and/or other storage services) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
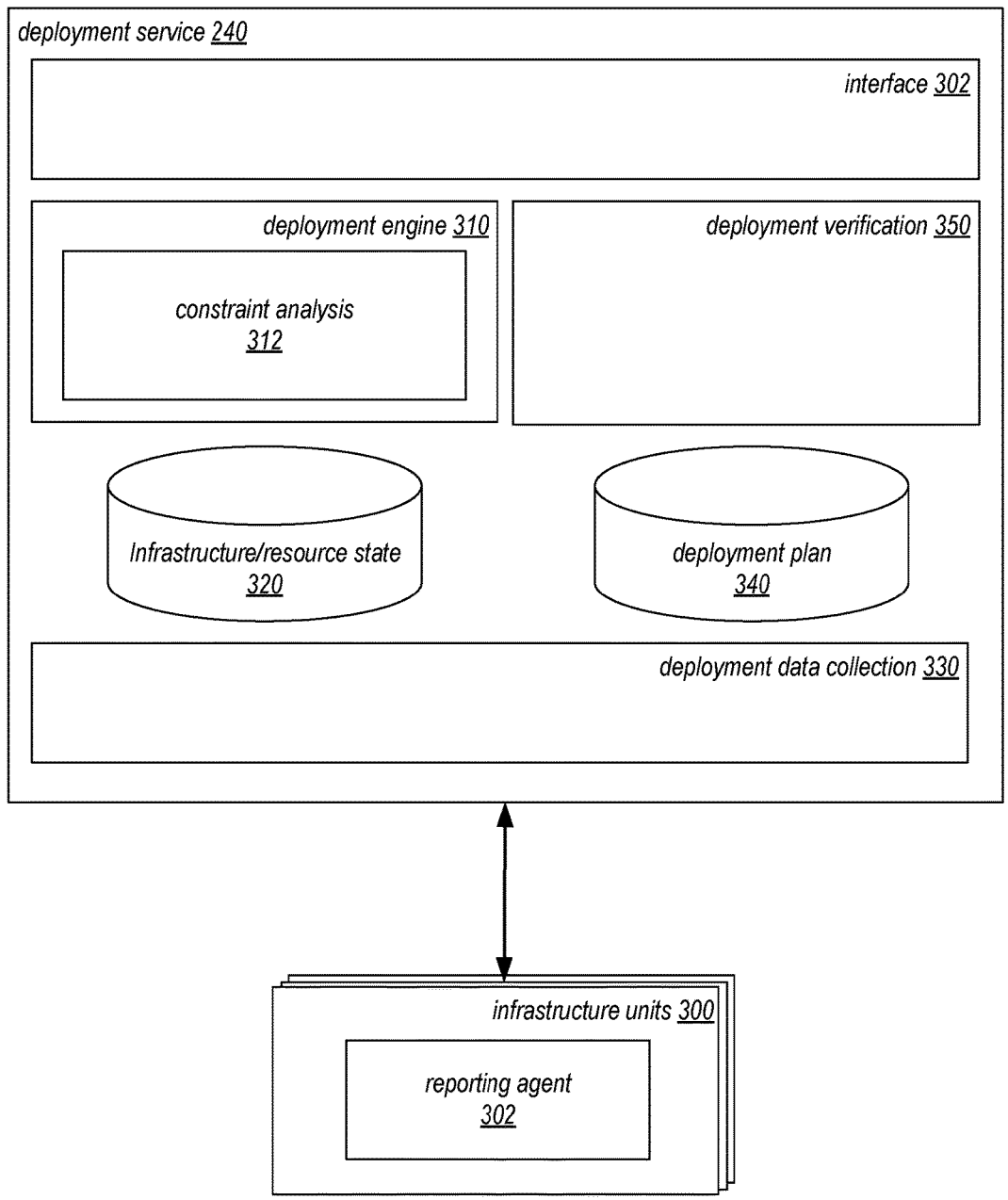
FIG. 3 is a logical block diagram illustrating a deployment service for a provider network, according to some embodiments.

FIG. 3 is a logical block diagram illustrating a deployment service for a provider network, according to some embodiments. Infrastructure units 300 may be implemented in order to host various computing resources provided by the services noted above in FIG. 2. For example, infrastructure units may be various groups or collections of resource hosts. A resource host may be one or more computing systems or devices, such as a storage server or other computing system (e.g., computing system 1000 described below with regard to FIG. 9). For a storage service like storage service 220, each resource host may maintain respective replicas of data volumes. Some data volumes may differ in size from other data volumes, in some embodiments. Resource hosts may also provide multi-tenant storage. For example, in some embodiments, one resource host may maintain a data volume for one account of block-based storage service 220, while another data volume maintained at the same resource host may be maintained for a different account. Resource hosts may persist their respective data volumes in one or more block-based storage devices (e.g., hard disk drives, solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host. Note that other types of infrastructure units, such as various networking devices, power devices, or any other infrastructure devices for implementing a provider network may be an infrastructure unit deployed according to resource hosting constraints.

In some instances, resource hosting constraints may be based on the ways in which different services implement resources. Block-based storage service 220, for instance, may manage and maintain data volumes in a variety of different ways. Different durability schemes may be implemented for some data volumes among two or more resource hosts as a distributed resource maintaining a same replica of a data volume at different resources associated with the data volume, which may result in different resource hosting constraints for infrastructure units that are part of block-based storage service 220. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, one resource host may serve as a master resource host. A master resource host may, in various embodiments, receive and process requests (e.g., I/O requests) from clients of the data volume. Thus, the master resource host may then coordinate replication of I/O requests, such as write requests, or any other changes or modifications to the data volume to one or more other resource hosts serving as slave resource hosts. Thus, when a write request is received for the data volume at a master resource host, the master resource host may forward the write request to the slave resource host(s) and wait until the slave resource host(s) acknowledges the write request as complete before completing the write request at the master resource host. Master resource hosts may direct other operations for data volumes, like snapshot operations or other I/O operations (e.g., serving a read request).

Please note, that in some embodiments, the role of master and slave resource hosts may be assigned per data volume. For example, for a data volume maintained at one resource host, the resource host may serve as a master resource host. While for another data volume maintained at the same resource host, the resource host may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

Infrastructure units may be deployed or operated within different infrastructure localities (which may be grouped to together in larger collections which may be called infrastructure zones). Infrastructure localities may be defined by devices, such as server racks, networking switches, routers, network spines, or other components, power sources (or other resource host suppliers), or physical or geographical locations (e.g., locations in a particular row, room, building, data center, fault tolerant zone, etc.). Infrastructure localities may vary in scope such that an infrastructure unit may be within multiple different types of infrastructure localities, such as a particular network router or brick, a particular room location, a particular site, etc.

Figure 9:
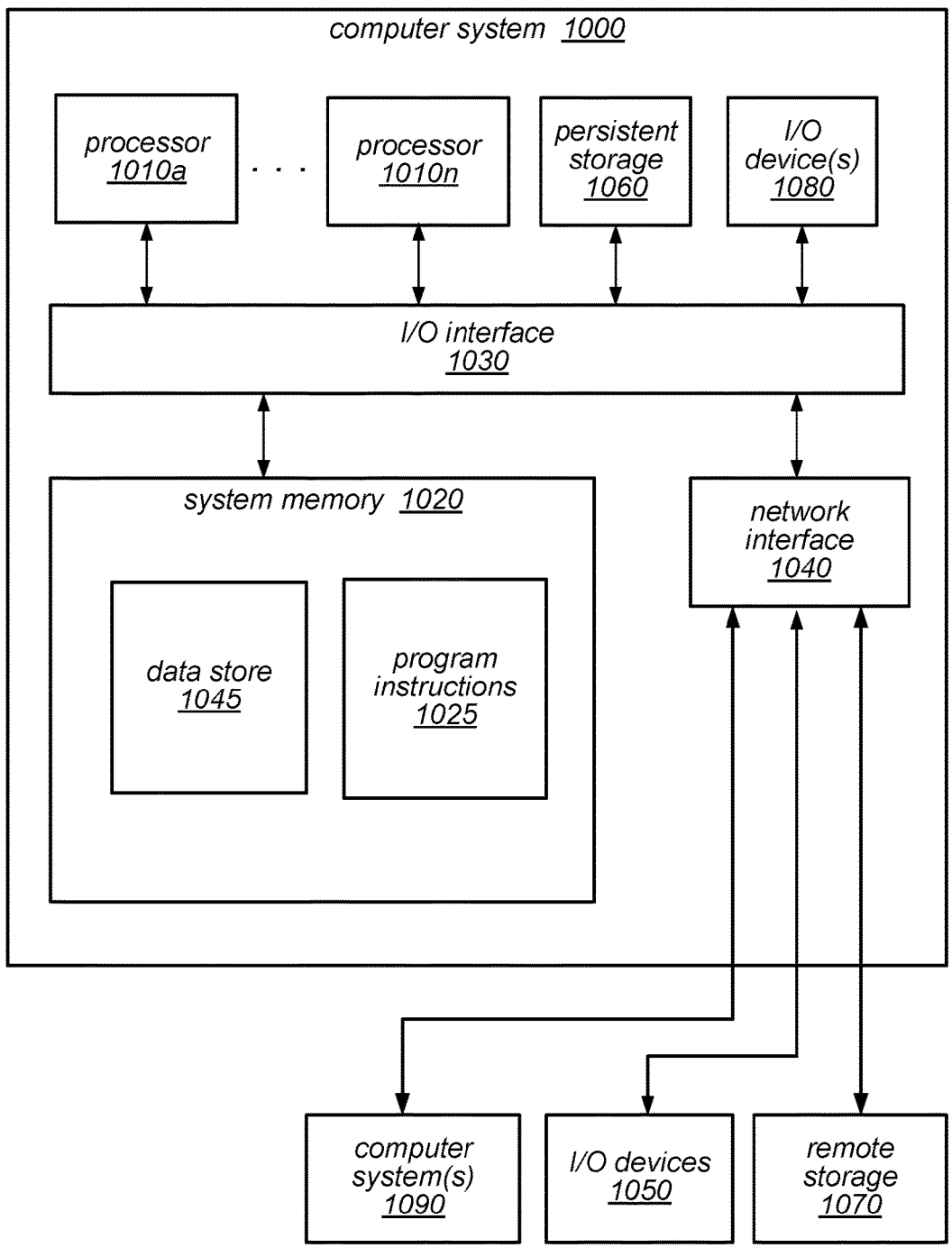
FIG. 9 is a block diagram illustrating an example computing system, according to some embodiments.

Deployment service 240 may be implemented at one or more computing nodes, systems, or devices (e.g., system 1000 in FIG. 9). In at least some embodiments, deployment service 240 may implement deployment data collection 330 to collect information, metrics, metadata, or any other information for performing infrastructure unit deployment. Deployment data collection 330 may periodically sweep resource unit(s) 300 with a query for the information, metrics, or metadata. For example, resource hosts on infrastructure units 300 may provide current utilization metrics, ongoing tasks or operations (e.g., such as migration or remirror tasks), and any other metadata/state information for the resource host, including information specific a resource, such as volume specific information for volumes residing at the resource hosts on the infrastructure unit. In some embodiments, deployment data collection 330 may aggregate the data according to infrastructure zones, infrastructure localities, infrastructure units, resources, resource hosts, or other granularities for block-based storage service 220 or other services (e.g., 230 and 250). Deployment data collection 320 may store the data at infrastructure/resource state store 320, which may persistently maintain the collected data. In some embodiments infrastructure/resource state store 320 may be implemented as a database or otherwise searchable/query-able storage system to provide access to other components of deployment service 240 or other services 220, 230, and 250.

Figure 6:
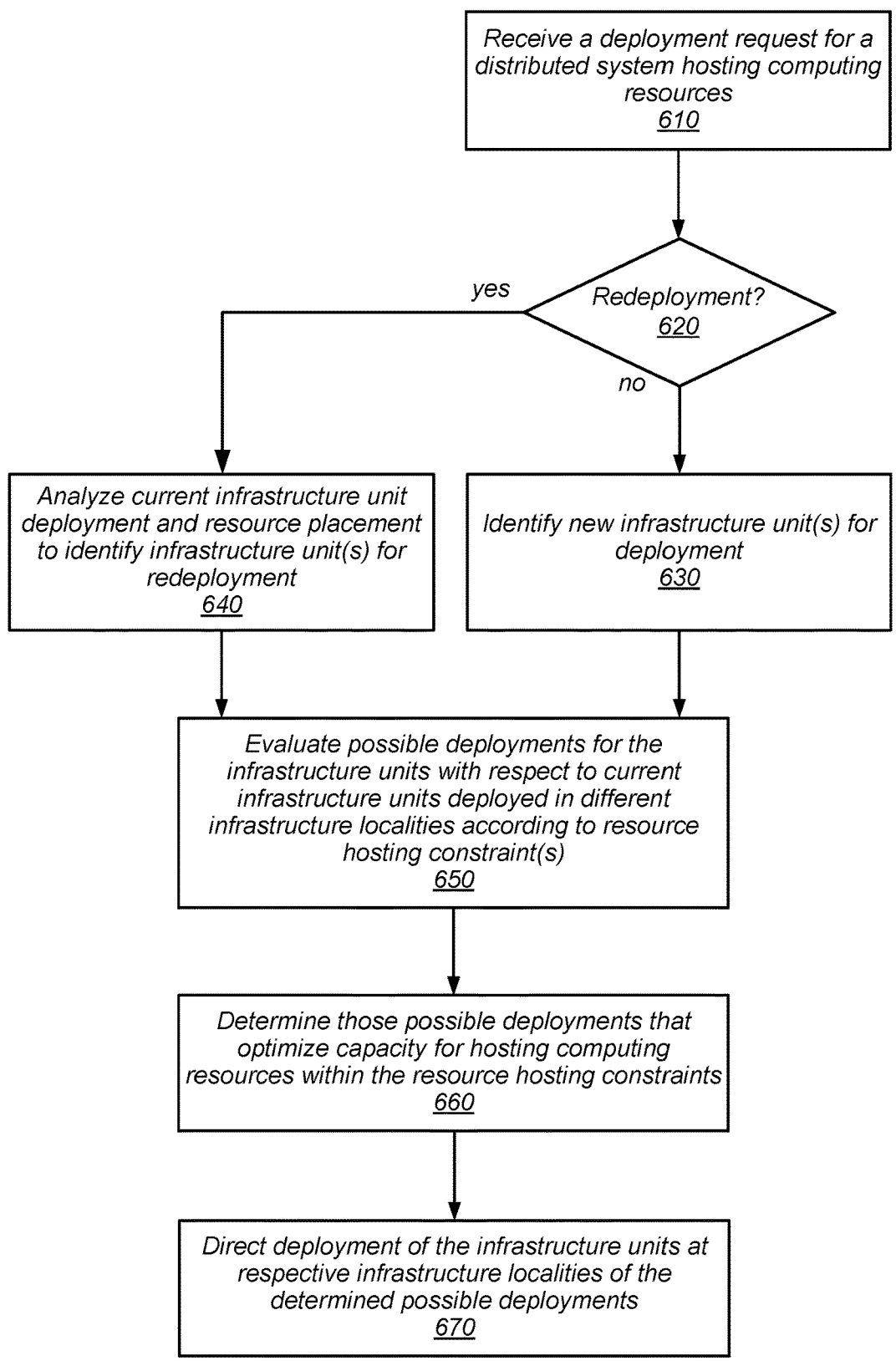
FIG. 6 is a high-level flowchart illustrating various methods and techniques for deploying infrastructure units according to resource hosting constraints, according to some embodiments.
Figure 7:
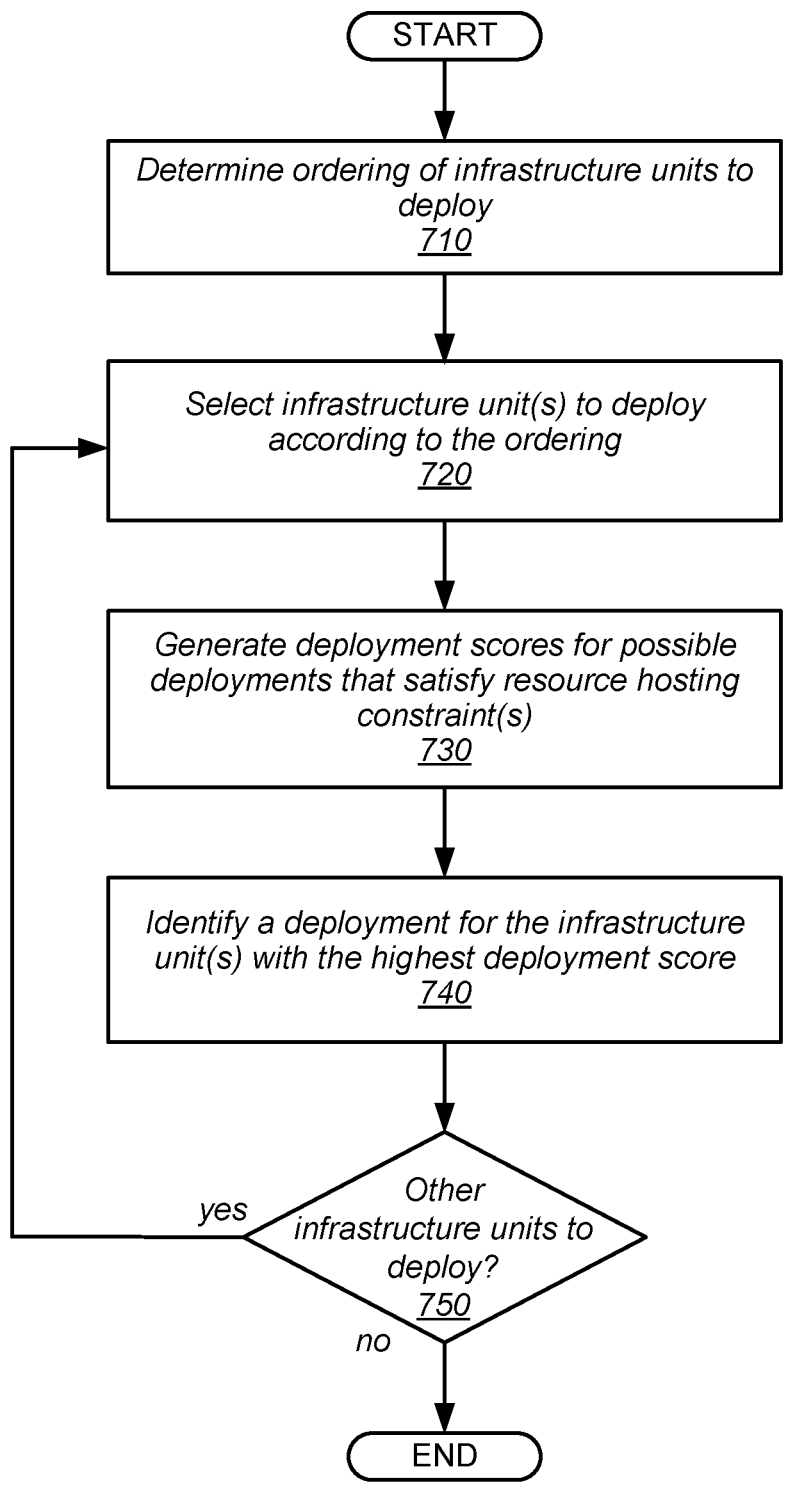
FIG. 7 is a high-level flowchart illustrating various methods and techniques for evaluating possible deployments with respect to resource hosting constraints, according to some embodiments.

Deployment service 240 may implement deployment engine 310. Deployment engine 310 may perform various kinds of analysis, such as constraint analysis 312, to identify deployments for infrastructure units, such as new server racks for different services to be installed at different infrastructure zones (e.g., at different data centers). Analysis may be performed with respect to computing resource hosting constraints, to determine deployments which may be optimal for resource hosting capacity for the different services. For instance, deployment engine 310 may implement constraint analysis 312 to evaluate possible deployments of infrastructure units with respect to currently deployed infrastructure units within different infrastructure localities according to resource hosting constraints. Different optimization functions may be applied to select from possible deployments those deployments that provide optimal hosting capacity within the resource hosting constraints. FIGS. 6 and 7, discussed below, provide various examples of techniques that may be implemented by deployment engine 310. Deployment plan 340 may be another data store that is updated when deployment decisions are made so that deployment directions may be provided upon demand for one or more multiple infrastructure units when the infrastructure units are deployed, or provided as whole plans to various requesting entities.

Resource hosting constraints may be dependent upon the resource being hosted. For example, resource hosting constraints for block-based storage service 220 may depend upon the ability of infrastructure units to host appropriate configurations of data volume replicas. For example, a resource hosting constraint may require that a master replica (e.g., of a data volume), and slave replica (e.g., of a data volume) be located within the same infrastructure locality. Similarly another resource hosting constraint may require that the master and slave replica be located within the same infrastructure locality as a storage client (e.g., a virtual compute instance of compute service 230). A resource hosting constraint may also require that the master and slave replicas be hosted on different storage server racks. Thus, constraint analysis 312 may consider the various resource hosting constraints when selecting deployments that optimize or increase the capacity for hosting computing resources within the resource hosting constraints.

In at least some embodiments, deployment service 240 may implement deployment verification 350. Deployment verification may receive indications of deployed infrastructure units via interface 302 or some other network-based or programmatic interface and perform various verification actions utilizing deployment plan 340 and deployment engine 310, as discussed below with regard to FIG. 8. Interface 302 may be implemented as part of deployment service 240 to provide a programmatic and/or graphical user interface so that deployment requests, such as those discussed below with regard to FIGS. 4 and 5 may be received at deployment service 240.

Figure 4:
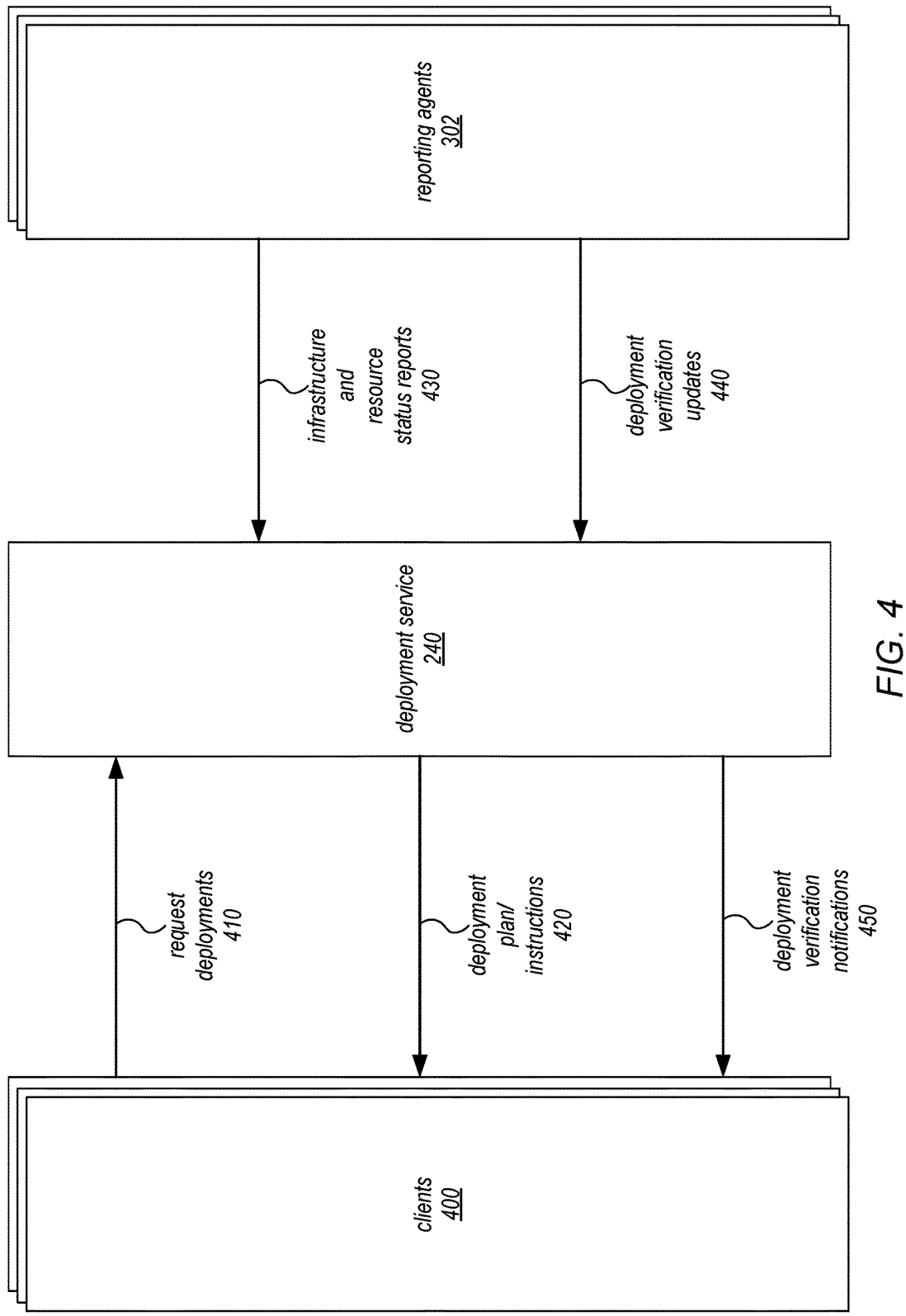
FIG. 4 illustrates interactions between a deployment service and clients and reporting agents, according to some embodiments.

FIG. 4 illustrates interactions between a deployment service and clients and reporting agents, according to some embodiments. Clients 400 may be one or more computing devices configured to access deployment service 240 via interface 302 or some other interface. In some embodiments, clients 400 may be operated by provider network agents or operators tasked with deploying new infrastructure units for the provider network services. Clients 400 may be acquisition and capacity planning systems for a provider network that identify acquired infrastructure units, including arrival and/or deployment schedules for the infrastructure units, in order to automatically generate deployment plans for the infrastructure units as they are ordered or acquired.

Clients 400 may send requests for deployments 410 to deployment service 240. requests may identify the infrastructure units to be deployed, as well as various information about the infrastructure units to be deployed such as various hosting characteristics (storage capacity, processing capacity, network bandwidth, etc.). In some embodiments, requests 410 may include a deployment schedule, calendar, or other information indicating the timing at which the infrastructure units may be deployed. Requests 410 may also include information to configure the performance of the deployment. In some embodiments, requests 410 may be requests for redeploying currently deployed infrastructure units. Such redeployment requests may be generated manually in response to a user/operator request, or may be provided by capacity monitoring or other control plane systems for individual services or the provider network as a whole to trigger evaluation and potential redeployment infrastructure units for the requesting services.

Reporting agents 302, as noted above, may provide various information to deployment service in order to allow deployment service to make deployment determinations. For example, updates may include infrastructure and resource status reports to identify the location of infrastructure units within different infrastructure localities, and the computing resources hosted thereon in order to make deployment determinations. In response to requests, such as deployment requests 410 or verification requests 440, such as discussed below with regard to FIG. 8, deployment service 240 may provide deployment plans and/or instructions 420 to clients 400. For example, deployment plans that map different infrastructure units to different infrastructure localities may be provided.

In addition to reporting current status, reporting agents 302 may also provide verification updates 440 when infrastructure units are deployed. For example, as discussed below with regard to FIG. 8, a verification indication may be provided which identifies the infrastructure locality and infrastructure unit which completed deployment. If the deployment was made to the wrong infrastructure locality, an error notification or other instructions may be provided as part of deployment verification notifications 450 (which may be provided to clients 400 or other stakeholders).

Figure 5:
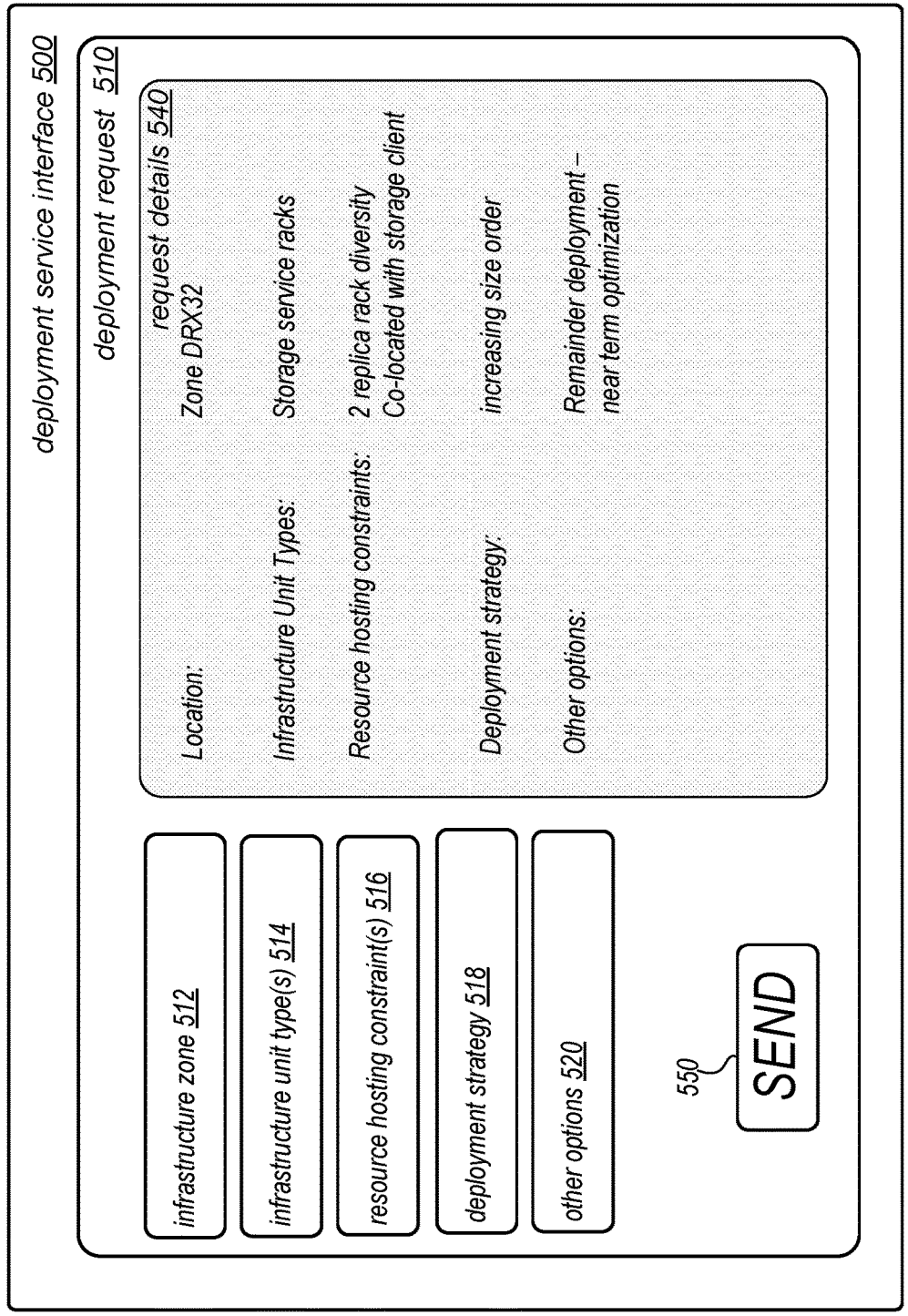
FIG. 5 is an example graphical user interface for submitting deployment requests, according to some embodiments.

FIG. 5 is an example graphical user interface for submitting deployment requests, according to some embodiments. Deployment service interface 500 may be a graphical user interface locally executing on a client or other device separate from a deployment service and/or may be a hosted interface, such as website, which provides various components for submitting a deployment request. Deployment request menu 510 may provide various user interface elements, such as drop down menus, buttons, or checkboxes, which can be used to select or specify various features of a deployment request. For example, in some embodiments, deployment request menu 510 may provide a user interface element to select the infrastructure zone 512 in which the deployment may be performed (e.g., by selectin from a list of different infrastructure zones).

In some embodiments, a user interface element 514 may be provided to specify the infrastructure unit type(s), such as storage server rack, computing server rack, power supply or distribution apparatus, networking device, or any other infrastructure unit type. In some embodiments, a user interface element 516 may be provided for identifying any resource hosting constraints that may be applicable to the infrastructure units (e.g., rack diversity, co-location). In some embodiments, a user interface element 518 may be provided to allow for the selection of a deployment strategy (e.g., determining an ordering in which infrastructure units may be deployed). In some embodiments, user interface element 520 may be provided to allow for the input or selection other options related to the performance of deployments, such as how to handle uncommon or final deployment scenarios. In some embodiments, a deployment schedule or calendar may be uploaded (e.g., via user interface elements not illustrated) for the infrastructure units.

Deployment request menu 510 may implement request details portion 540 in order to display selected information associated with a request. For example, Zone DRX32 may be the location for deployment, storage service racks may be the infrastructure unit types, 2 replica rack diversity and co-location with a storage client may be the resource hosting constraints, increasing size order may be the deployment strategy, and remainder deployment may be performed to provide near term optimization as another option. Send user interface element 550 may be selected to submit the deployment request.

The examples of deploying infrastructure units according to resource hosting constraints as discussed above with regard to FIGS. 2-5 have been given in regard to a block-based storage service and/or other network-based services. Various other types or configurations of distributed systems deploying infrastructure units may implement these techniques. Different configurations of the various modules, components, systems, and or services described above that may implement deploying infrastructure units according to resource hosting constraints may be configured to evaluate possible deployments. FIG. 6 is a high-level flowchart illustrating various methods and techniques for deploying infrastructure units according to resource hosting constraints, according to some embodiments. These techniques may be implemented deployment service for deploying infrastructure units in a distributed system, as described above with regard to FIGS. 2-5.

As indicated at 610, a deployment request for a distributed system hosting computing resources may be received. The deployment request may indicate infrastructure units for deployment (e.g., new infrastructure units to be added) or may identify a request for redeployment of one or more infrastructure units. The request may be received via an interface, such as the graphical user interface illustrated in FIG. 5 above, and may include various information to configure the performance of determining deployment of infrastructure units, such as by specifying the deployment strategy. An ordering, schedule, or other indication of the arrival and deployment of infrastructure units may be specified (e.g., 1 infrastructure unit arrives tomorrow, 2 infrastructure units arrive 2 weeks from tomorrow, and another infrastructure unit arrives 18 days from now).

If the request is a request for redeployment, as indicated by the positive exit from 620 then current infrastructure unit deployment and resource placement may be analyzed to identify infrastructure unit(s) for redeployment, as indicated at 640. Consider an example where an infrastructure unit is deployed in a location where it can be fully or efficiently utilized, such as storage server rack for a block-based storage service like block-based storage service 220 in FIG. 2 which is deployed in a location without many storage client server racks or other devices that utilize the storage. Such a storage server rack may be identified for redeployment, similar to techniques for optimizing resource hosting capacity as discussed below (e.g., based on various techniques such as generating redeployment scores for candidate infrastructure units). If the request is not a redeployment request, then the new infrastructure unit(s) for deployment may be identified, as indicated at 630, including identifying the type of infrastructure units and the characteristics of the units (e.g., capacity, performance, or other characteristics indicative of computing resource hosting).

Once the infrastructure unit(s) for deployment are detected, then as indicated at 650, possible deployments for the infrastructure units with respect to current infrastructure units deployed in different infrastructure localities may be evaluated with respect to resource hosting constraints. Resource hosting constraints, as noted above, may be provide a limitation, requirement, or other restriction on the ways in which resources can be hosted at infrastructure units. For example server rack diversity constraints for replicas or other instances of resources may be required within an infrastructure locality. Similarly, some resource hosting constraints may be directed to having certain types of infrastructure units co-located with others, such as having storage infrastructure units co-located with infrastructure units hosting clients of the storage. As discussed below with regard to FIG. 7, in at least some embodiments, an analysis may be performed for the possible deployments with respect to one or more infrastructure zone localities. For instance an infrastructure zone locality category may be identified for the possible deployments. Other analysis may also be performed to generate a deployment score. For instance, in at least some embodiments, an analysis may be performed on prospective deployments with respect to different performance metrics of the infrastructure unit's capacity to host computing resources in order to be able to optimize or increase the resource hosting capacity. For example, storage capacity, workload, IOPs, number of resources that may be hosted, location diversity, and software may be evaluated for the infrastructure units with respect to different deployment locations.

As indicated at 660, those possible deployments that optimize or increase capacity for hosting computing resources within the resource hosting constraints, may be determined. For example, those possible deployments with the highest scores or other metrics of resource hosting capacity may be selected in order to optimize or increase the capacity for hosting resources. Different optimizing functions may be implemented to identify desirable capacity scenarios. For instance, some optimizing functions may prioritize the selection of possible deployments which provide a greatest immediate increase to resource hosting capacity, while other optimizing functions may prioritize greater long-term or overall resource hosting capacity gains. Optimizing functions may be specified as part of the deployment request or may be determined based on an initial analysis of the infrastructure units to be deployed. For instance, if the infrastructure units are all to be deployed at a same time, then an optimizing function that prioritizes near time optimization may be utilized, whereas if the infrastructure units are to be deployed in staggered fashion over a period, then an optimizing function that prioritizes a long-term capacity may be determined (e.g., selecting an optimizing function that identifies deployments that provide a greatest data volume per minute capacity within a given year).

As indicated at 670, deployment of the infrastructure units at the respective infrastructure localities of the determined possible deployments may be directed. In some embodiments, deployments may be directed when infrastructure units are received and/or ready for deployment. For example requests may be sent to a deployment engine identifying a particular infrastructure unit and asking for the deployment location of the infrastructure unit. The deployment engine may provide an indication of the determined infrastructure locality (e.g., by providing the appropriate identifier, mapping, or location value that indicates the infrastructure locality). In some embodiments, directing deployment may be performed by providing deployment plans, instructions, or other real time indications of deployments to operators deploying infrastructure units.

Many different evaluations and determinations of possible deployments may be performed according to the different resource hosting constraints. FIG. 7 is a high-level flowchart illustrating various methods and techniques for evaluating possible deployments with respect to resource hosting constraints, according to some embodiments. As indicated at 710, a determination may be made as to the ordering infrastructure units identified for deployment. For example, different orderings of infrastructure units to be deployed may be determined based on various characteristics of the infrastructure units. For example, for storage server racks as may be deployed for a storage service like block-based storage service 220 in FIG. 2 above, the amount of storage (e.g., in bytes) may be used to determine an ordering for additional storage racks to be deployed, in increasing or decreasing ordering. In at least some embodiments, the ordering of infrastructure units may be configurable according to one of the various options discussed above with regard to FIG. 5.

As indicated at 720, infrastructure unit(s) may be selected according to the ordering for deployment, in some embodiments. For example, infrastructure units may be selected by taking the next infrastructure units which have not had a deployment identified for evaluation in the determined ordering. In some embodiments, multiple infrastructure units may be evaluated at a time in order to satisfy resource hosting constraints. For example, in some embodiments, a storage server racks for a block-based storage service, like block-based storage service 220 in FIG. 2 above, may be selected according to a number of storage server rack diverse replicas maintained of a data volume. If two server rack diverse replicas are maintained, then two storage server racks may be selected. If three server rack diverse replicas are maintained, then three storage server racks may be selected, and so on.

Possible deployments for the selected infrastructure units may be identified, in some embodiments. Possible deployments may be determined by examining the availability of various infrastructure localities to include the selected infrastructure unit(s). For those scenarios where multiple infrastructure units are selected, possible deployments may be identified which co-locate one or more of the infrastructure units in the same infrastructure locality as well as those possible deployments where each infrastructure unit is in a different infrastructure locality. Possible deployments may also be determined as those possible deployments that satisfy resource hosting criteria. For example, possible deployments for storage server racks may have to be collocated in infrastructure localities with virtual computing server racks or other devices that host storage clients. If no such racks are deployed or included in an infrastructure locality, then the infrastructure locality may not satisfy resource hosting constraints of co-locating storage server racks with storage clients in an infrastructure locality. In some embodiments, some possible deployments may be excluded. For example, certain infrastructure unit type restrictions or co-location restrictions may be imposed so that some deployment combinations may not be allowed. Excluded possible deployments may not be considered or evaluated.

As indicated at 730, deployment scores may be generated for possible deployments that satisfy the resource hosting constraints. For example, in the example storage rack server placement example given above, the amount of demand for a storage server rack (e.g. in bytes) which may be satisfied by placing a rack in an infrastructure locality may be determined as the deployment score for the possible placement. In some embodiments, a score may be generated for a possible deployment that involves multiple infrastructure units (e.g., two storage server racks in an infrastructure locality). As indicated at 740, a deployment for the infrastructure units with the highest deployment score may be identified, in some embodiments. For example, a deployment where two infrastructure units are placed in different infrastructure localities may have a higher score than a deployment where the two infrastructure units are placed in the same locality.

As noted at 750, if other infrastructure units remain to be identified for deployment, then the techniques illustrated in FIG. 7 may be repeated until all of the infrastructure units have been selected and deployment identified. For some iterations, the deployment identification techniques may change. Consider the scenario where multiple infrastructure units are evaluated at a time. If a remaining number of infrastructure units in the ordering is less than the multiple selected for previous evaluations, then the evaluation of possible deployments for the remaining infrastructure units may be different. For example, some resource hosting constraints may be changed or removed (e.g., rack diversity constraints).

Figure 8:
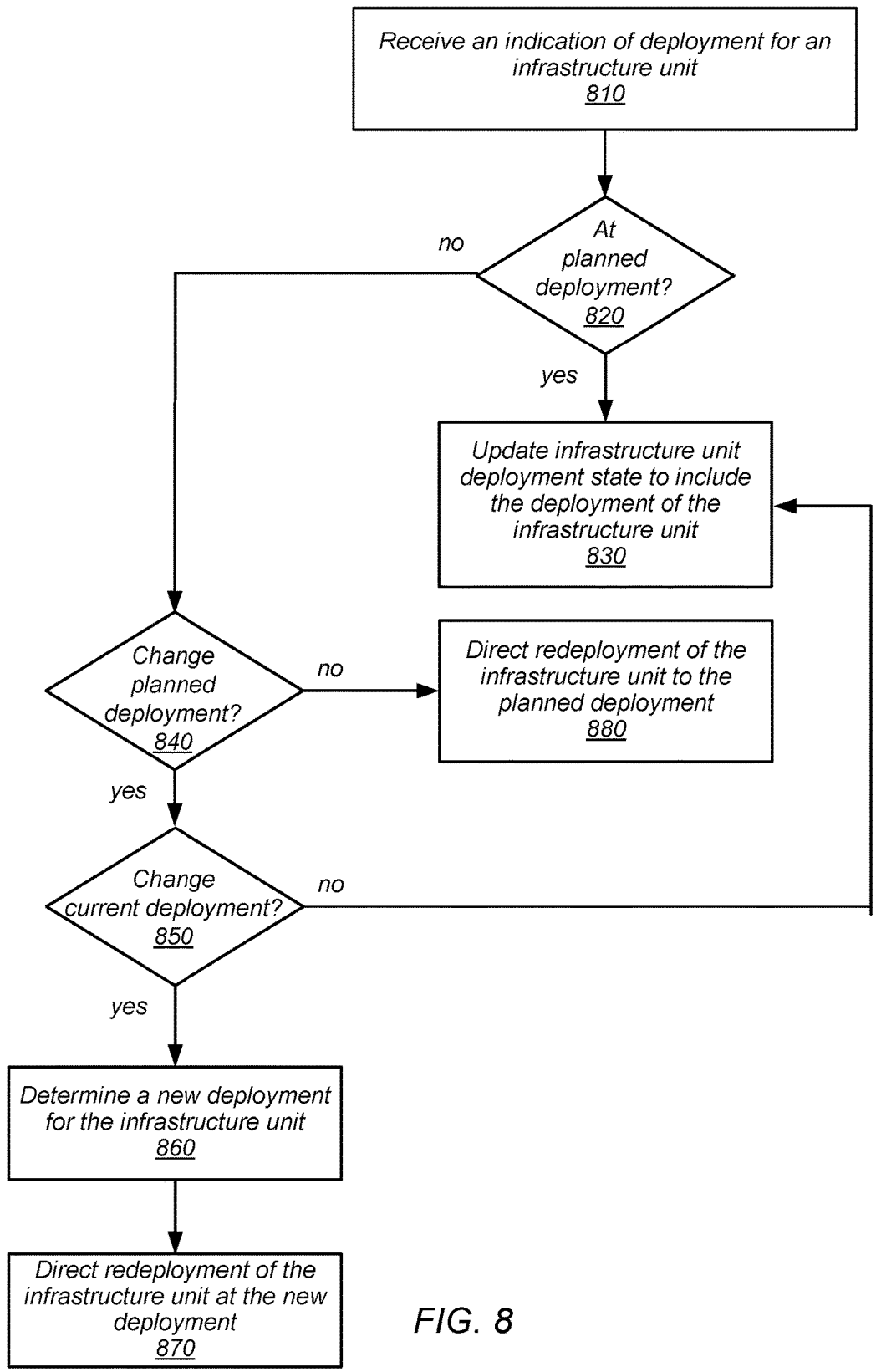
FIG. 8 is a high-level flowchart illustrating various methods and techniques for verifying deployments performed according to resource hosting constraints, according to some embodiments.

In addition to providing real-time direction for deploying infrastructure units, verification and/or redeployment of infrastructure units may be performed as well. FIG. 8 is a high-level flowchart illustrating various methods and techniques for verifying deployments performed according to resource hosting constraints, according to some embodiments. As indicated at 810, an indication of deployment may be received for an infrastructure unit. For example, a message may be sent by a reporting agent installed at the infrastructure unit (e.g., a reporting agent executing on one or more servers in a server rack) which identifies the infrastructure unit (e.g., a product number, asset tag, or other unique identifier), type of infrastructure unit (e.g., types of servers, devices, or other components provided as part of the infrastructure unit), and an identifier for the infrastructure locality at which the infrastructure unit has been deployed (e.g., an identifier for a network brick to which the infrastructure unit has been connected or a room in which the infrastructure unit has been deployed). The message may be formatted according to an API or other programmatic interface for a deployment engine, and may be executed upon start up, power on, or as part of any other actions to bring the infrastructure unit into active service for hosting resources as part of the distributed system.

As indicated at 820, a determination may be made as to whether the infrastructure unit has been deployed at a planned infrastructure locality (e.g., as may have been determined according to the techniques discussed above with regard to FIGS. 6 and 7). For example, a deployment plan or other set of information that maintains the infrastructure localities mapped to infrastructure units to be deployed may be accessed and evaluated for the infrastructure unit indicated in the message. If the identifier for the infrastructure locality does not match the infrastructure locality indicated in the plan, then the deployment may be determined not to have been performed at the planned infrastructure locality.

For those deployments that are performed as planned, as indicated by the positive exit from 820, state information for the infrastructure unit may be updated to include the deployment of the infrastructure unit. The state information discussed above, for instance, may be accessed and changed to include the deployment location, infrastructure type, and/or other information included in the indication of deployment (e.g., the various identifiers) to be maintained as part of the state information.

If, however, the deployment did not occur at the planned deployment location, a determination may be made as to whether to change the planned deployment, as indicated, at 840. For example, a cost-benefit analysis may be performed to determine whether downtime, labor costs, changes in current deployment state of the distributed system, or any other costs associated with performing redeployment outweigh the benefits of the planned deployment. If the current infrastructure locality is only marginally less optimal than the planned infrastructure locality, the costs may not outweigh the benefits of performing a redeployment to the planned location. However, if, for instance, the current deployment results in a significant loss of potential resource hosting capacity, then, as indicated by the negative exit from 840, the planned deployment may be kept. As indicated at 880, redeployment of the infrastructure unit may be performed to deploy the infrastructure unit at the planned infrastructure locality.

In some embodiments, if the planned infrastructure locality is not kept, the current infrastructure locality may still be changed. For example, the techniques described above with regard to FIGS. 6 and 7 may be performed to see if a redeployment of the infrastructure unit may result in a more optimal deployment. As with 840 above, a cost benefit analysis may be performed as to whether the costs of a redeployment outweighs the benefits obtained. For those situations where redeployment is beneficial, a new deployment may be determined, as indicated at 860, and redeployment of the infrastructure unit may be directed to the new deployment, as indicated at 870. If, however, the costs outweigh the benefits of redeployment, then as indicated by the negative exit from 850, the infrastructure unit may be kept in its current deployment locality, and thus state information to indicate the current deployment may be updated, as indicated at 830.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Embodiments of deploying infrastructure units according to resource hosting constraints as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
   a plurality of infrastructure localities comprising respective server racks implementing one or more servers that host computing resources for the distributed system;
   a data store, configured to maintain metadata for the infrastructure localities;
   at least one compute node comprising a processor and a memory, that implement a deployment engine for the distributed system, wherein the deployment engine is configured to:
      receive, via an interface for the deployment engine, a request to deploy one or more additional server racks comprising one or more additional servers in the distributed system;
      access the metadata in the data store to evaluate possible deployments for the additional server racks with respect to the server racks in the infrastructure localities of the distributed system according to one or more resource hosting constraints for the distributed system; and
      identify different ones of the possible deployments for the additional server racks that optimize capacity for hosting the computing resources within the one or more resource hosting constraints for the distributed system; and
      direct the deployment of the additional server racks at respective infrastructure localities of the identified possible deployments in the distributed system.

2. The system of claim 1,
   wherein the additional server racks are storage server racks;
   wherein the one or more resource hosting constraints comprise:
      a diversity constraint for storage replicas within a same infrastructure locality; and
      a constraint that co-locates storage clients utilizing storage resources on the storage server racks within the same infrastructure locality; and
   wherein to identify the different ones of the possible deployments for the additional server racks that optimize capacity for hosting the computing resources, the deployment engine is configured to determine the infrastructure localities expected to have a greatest additional storage demand for hosted storage clients within the diversity constraint.

3. The system of claim 1, wherein to direct the deployment of the additional server racks, the deployment engine is configured to:
   receive an indication of deployment for one of the additional server racks in the distributed system; and
   verify an infrastructure locality included in the indication as the identified infrastructure locality for the additional server rack.

4. The system of claim 1, wherein the distributed system is a provider network that offers the computing resources hosted at the distributed system to clients of the provider network, wherein the additional server racks provide additional block-based storage for a virtual block-based storage service implemented as part of the provider network.

5. A method, comprising:
   performing, by one or more computing devices:
      detecting one or more infrastructure units to deploy in a distributed system for hosting computing resources in the distributed system;
      evaluating possible deployments for the infrastructure units at different infrastructure localities of the distributed system with respect to current infrastructure units deployed in the different infrastructure localities according to one or more resource hosting constraints for the distributed system;
      based on the evaluating, determining different ones of the possible deployments for the infrastructure units that increase capacity for hosting the computing resources within the one or more resource hosting constraints for the distributed system; and
      directing the deployment of the infrastructure units at respective infrastructure localities of the determined possible deployments in the distributed system.

6. The method of claim 5,
   wherein detecting the one or more infrastructure units to deploy comprises analyzing the current infrastructure units deployed in the different infrastructure localities according to the one or more resource hosting constraints for the distributed system to determine one or more of the current infrastructure units for redeployment.

7. The method of claim 5, wherein the one or more computing devices implement a deployment engine for the distributed system, and wherein detecting the one or more infrastructure units to deploy comprises receiving a request to determine deployments for the one or more infrastructure units via a programmatic interface for the deployment engine.

8. The method of claim 7, wherein the request identifies a deployment strategy for the one or more infrastructure units, and wherein the evaluating and the determining are performed according to the deployment strategy identified in the request.

9. The method of claim 5, wherein directing the deployment of the infrastructure units comprises:
   receiving an indication that one of the infrastructure units is ready for deployment; and
   providing the determined infrastructure locality for the one infrastructure unit.

10. The method of claim 5, further comprising:
    receiving an indication of deployment for one of the infrastructure units; and
    verifying that the deployment for the one infrastructure unit is at the determined infrastructure locality for the one infrastructure unit.

11. The method of claim 10, further comprising:
    in response to determining that the deployment for the one infrastructure unit is not at the determined infrastructure locality for the one infrastructure unit according to the verifying:
       determining a different infrastructure locality for the one infrastructure unit; and
       directing redeployment of the one infrastructure unit to the different infrastructure locality.

12. The method of claim 5, wherein the direction of the deployment at the respective infrastructure localities of the determined possible deployments in the distributed system occurs at different points in time over a period of time.

13. The method of claim 5, wherein the distributed system is a provider network that offers a plurality of different network-based services to clients of the provider network, wherein the different infrastructure localities are network infrastructure localities within the provider network.

14. A non-transitory, computer-readable storage medium, storing program instructions that when executed by one or more computing devices cause the one or more computing devices to implement:
    maintaining metadata for a plurality of infrastructure localities comprising respective infrastructure units that host computing resources for a distributed system;
    identifying one or more infrastructure units to deploy in a distributed system for hosting computing resources in the distributed system;
    accessing the metadata to evaluate possible deployments for the identified infrastructure units at the infrastructure localities with respect to the respective infrastructure units deployed in the infrastructure localities of the distributed system according to one or more resource hosting constraints for the distributed system;
    determining different ones of the possible deployments for the infrastructure units that increase capacity for hosting the computing resources within the one or more resource hosting constraints for the distributed system; and
    directing the deployment of the infrastructure units at those infrastructure localities of the determined possible deployments in the distributed system.

15. The non-transitory, computer-readable storage medium of claim 14, wherein the one or more computing devices implement a deployment engine for the distributed system, and wherein, in identifying the one or more infrastructure units to deploy, the program instructions cause the one or more computing devices to implement:
    receiving request to deploy the one or more infrastructure units via a graphical user interface for the deployment engine.

16. The non-transitory, computer-readable storage medium of claim 14,
    wherein, in accessing the metadata to evaluate possible deployments for the identified infrastructure units at the infrastructure localities, the program instructions cause the one or more computing devices to implement generating deployment scores for the possible deployments that satisfy the one or more resource hosting constraints; and
    wherein, in determining the different ones of the possible deployments for the infrastructure units that increase capacity, the program instructions cause the one or more computing devices to implement identifying those possible deployments with a highest deployment score for the infrastructure units.

17. The non-transitory, computer-readable storage medium of claim 14, wherein the infrastructure localities are respective network devices in the distributed system.

18. The non-transitory, computer-readable storage medium of claim 14, wherein the program instructions cause the one or more computing devices to further implement:
    receiving an indication of deployment for one of the infrastructure units; and
    verifying that the deployment for the one infrastructure unit is at the determined infrastructure locality for the one infrastructure unit.

19. The non-transitory, computer-readable storage medium of claim 18, wherein the program instructions cause the one or more computing devices to further implement:
    in response to determining that the deployment for the one infrastructure unit is not at the determined infrastructure locality for the one infrastructure unit according to the verifying:
       directing redeployment of the one infrastructure unit to the determined infrastructure locality.

20. The non-transitory, computer-readable storage medium of claim 14, wherein the distributed system is a provider network that provides a plurality of network-based services including a virtual block-based storage service and a virtual compute service, wherein the one or more infrastructure units are additional storage server racks for the virtual block-based storage service, and wherein the resource hosting constraint comprises a constraint for co-locating a data volume hosted at the virtual block-based storage service in a same infrastructure locality as a virtual compute instance hosted at the virtual computing service that is a client of the data volume.

* * * * *